(12) United States Patent
Yamaya et al.

(10) Patent No.: US 10,593,939 B2
(45) Date of Patent: Mar. 17, 2020

(54) CATHODE MATERIAL FOR LITHIUM-ION SECONDARY BATTERY, CATHODE FOR LITHIUM-ION SECONDARY BATTERY, AND LITHIUM-ION SECONDARY BATTERY

(71) Applicant: SUMITOMO OSAKA CEMENT CO., LTD., Tokyo (JP)

(72) Inventors: Ryuuta Yamaya, Tokyo (JP); Susumu Murata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 43 days.

(21) Appl. No.: 15/936,132

(22) Filed: Mar. 26, 2018

(65) Prior Publication Data

US 2019/0097214 A1 Mar. 28, 2019

(30) Foreign Application Priority Data

Sep. 28, 2017 (JP) ................................. 2017-187758

(51) Int. Cl.
*H01M 4/36* (2006.01)
*H01M 4/136* (2010.01)
(Continued)

(52) U.S. Cl.
CPC ........... *H01M 4/366* (2013.01); *H01M 4/133* (2013.01); *H01M 4/136* (2013.01); *H01M 4/587* (2013.01);
(Continued)

(58) Field of Classification Search
CPC ....... H01M 10/0525; H01M 2004/021; H01M 2004/028; H01M 2220/30;
(Continued)

(56) References Cited

U.S. PATENT DOCUMENTS

2015/0364749 A1* 12/2015 Kim ...................... H01M 4/139
252/506
2016/0093878 A1* 3/2016 Ooishi .................. H01M 4/366
429/221
2018/0097231 A1 4/2018 Oyama et al.

FOREIGN PATENT DOCUMENTS

CN 106233512 A 12/2016
JP 2009-004371 A 1/2009
(Continued)

OTHER PUBLICATIONS

Scientific and Technical Information Center (STIC) search results from Scott Segal (Year: 2019).*
(Continued)

*Primary Examiner* — Robert S Jones
*Assistant Examiner* — Victoria H Lynch
(74) *Attorney, Agent, or Firm* — Merchant & Gould P.C.

(57) ABSTRACT

A cathode material for a lithium-ion secondary battery including: active material particles including central particles represented by general formula $Li_xA_yD_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\le 1$, $0\le z<1$, and $0.9<y+z<1.1$) and a carbonaceous film that coats surfaces of the central particles, wherein, when a mixture of the active material particles, a conductive auxiliary agent and a binder in which a mixing ratio thereof is 94:1:5 in terms of a mass ratio is dissolved in a solvent to form paste having a total solid content amount of 45% by mass, a viscosity of the past is 5,000 mPa·s or less at a shear rate of 4.0 [1/s].

13 Claims, 1 Drawing Sheet

(51) Int. Cl.
　　　*H01M 4/58*　　　(2010.01)
　　　*H01M 10/0525*　(2010.01)
　　　*H01M 4/62*　　　(2006.01)
　　　*H01M 4/133*　　(2010.01)
　　　*H01M 4/587*　　(2010.01)
　　　*H01M 4/02*　　　(2006.01)

(52) U.S. Cl.
　　　CPC ......... *H01M 4/5825* (2013.01); *H01M 4/625* (2013.01); *H01M 10/0525* (2013.01); *H01M 2004/021* (2013.01); *H01M 2004/028* (2013.01); *H01M 2220/30* (2013.01); *H01M 2300/0037* (2013.01)

(58) Field of Classification Search
　　　CPC ......... H01M 2300/0037; H01M 4/133; H01M 4/136; H01M 4/366; H01M 4/5825; H01M 4/587; H01M 4/625
　　　See application file for complete search history.

(56) References Cited

FOREIGN PATENT DOCUMENTS

| | | |
|---|---|---|
| JP | 2011-049161 A | 3/2011 |
| JP | 2012-104290 A | 5/2012 |
| JP | 2017-143049 A | 8/2017 |
| JP | 6210144 B | 10/2017 |
| KR | 10-2014-0090956 A | 7/2014 |

OTHER PUBLICATIONS

Scientific and Technical Information Center (STIC) search results from Julia Wang (Year: 2019).*

Office Action for Japanese Patent Application No. 2017-187758 (dated Jan. 30, 2018).

Japanese Patent Application No. 2017-187448, filed Sep. 28, 2017, with English translation of Abstract.

* cited by examiner

CATHODE MATERIAL FOR LITHIUM-ION SECONDARY BATTERY, CATHODE FOR LITHIUM-ION SECONDARY BATTERY, AND LITHIUM-ION SECONDARY BATTERY

CROSS-REFERENCE TO RELATED APPLICATIONS

This application claims the benefit of Japanese Patent Application No. 2017-187758 filed Sep. 28, 2017, the disclosure of which is herein incorporated by reference in its entirety.

BACKGROUND OF THE INVENTION

Field of the Invention

The present invention relates to a cathode material for a lithium-ion secondary battery, a cathode for a lithium-ion secondary battery, and a lithium-ion secondary battery.

Description of Related Art

In recent years, as batteries anticipated to have a small size and a high capacity and weigh less, non-aqueous electrolytic solution-based secondary batteries such as lithium-ion secondary batteries have been proposed and put into practical use. Lithium-ion secondary batteries are constituted of a cathode and an anode which have properties capable of reversibly intercalating and deintercalating lithium ions, and a non-aqueous electrolyte.

As anode active materials for anode materials of lithium-ion secondary batteries, generally, carbon-based materials or Li-containing metal oxides having properties capable of reversibly intercalating and deintercalating lithium ions are used. Examples of the Li-containing metal oxides include lithium titanate ($Li_4Ti_5O_{12}$).

Meanwhile, as cathodes of lithium-ion secondary batteries, cathode material mixtures including a cathode material, a binder, and the like are used. As a cathode active material, for example, Li-containing metal oxides having properties capable of reversibly intercalating and deintercalating lithium ions such as lithium iron phosphate ($LiFePO_4$) are used. In addition, cathodes of lithium-ion secondary batteries are formed by applying the cathode material mixture onto the surface of a metal foil that is called an electrode current collector.

As electrolytic solutions for lithium-ion secondary batteries, non-aqueous solvents are used. Non-aqueous solvents enable the application of cathode active materials that are oxidized and reduced at a high potential or anode active materials that are oxidized and reduced at a low potential. Therefore, lithium-ion secondary batteries having a higher voltage can be realized.

These lithium-ion secondary batteries have a small size and a higher energy and weigh less than secondary batteries in the related art such as lead batteries, nickel cadmium batteries, and nickel metal hydride batteries. Therefore, lithium-ion secondary batteries are used not only as small-sized power supplies used in portable electronic devices such as mobile phones and notebook personal computers but also as large-sized stationary emergency power supplies.

In recent years, there has been a demand for the performance improvement of lithium-ion secondary batteries, and a variety of studies have been carried out. For example, in a case in which a lithium-ion secondary battery is used in a high-current density region, there is a demand for additional improvement in electron conductivity in order to improve the performance. Regarding the above-described property demands, techniques for coating the surfaces of cathode active materials with a carbonaceous material (hereinafter, in some cases, referred to as "carbonaceous film") are known (for example, refer to Japanese Laid-open Patent Publication No. 2009-004371, Japanese Laid-open Patent Publication No. 2011-049161, and Japanese Laid-open Patent Publication No. 2012-104290). As a method for coating the surface of a cathode active material with a carbonaceous film, methods in which a cathode active material and a carbon source are mixed together and this mixture is calcinated in an inert atmosphere or a reducing atmosphere are known.

SUMMARY OF THE INVENTION

When pores are present in agglomerates (granules) of the primary particles of a cathode active material coated with a carbonaceous film, the pores incorporate solvents or binders during the production of electrode paste, and an increase in the paste viscosity or the degradation of the binding property is caused. In addition, the pores in the granules also become pores in electrodes, and the energy density per unit volume decreases.

Meanwhile, the increase in the paste viscosity or the degradation of the binding property can be suppressed by cracking the granules (eliminating the pores); however, when the cracking intensity is too strong, the carbonaceous film is peeled off from the surface of the primary particles of the cathode active material, the electron conductivity decreases, and an increase in the specific surface area causes an increase in the paste viscosity. The decrease in the electron conductivity causes the degradation of input and output characteristics or a decrease in the capacity after charging and discharging cycles. In addition, the increase in the paste viscosity causes the generation of unevenness on coated surfaces during the application of paste to electrode current collectors or the unevenness of electrode structures due to the variation of coating thicknesses. On the other hand, when the cracking intensity is too weak, the pores remain in electrodes, and the energy density of the electrodes per unit volume decreases.

For the above-described reasons, it is most preferable to crack the cathode material to necessary agglomerate particle sizes while guaranteeing the electron conductivity by suppressing the peeling of the carbonaceous film. However, the cracking intensity at which the carbonaceous film begins to peel off varies depending on the primary particle diameter of the cathode active material, the amount of carbon included in the cathode material, or the like, and thus it is difficult to optimally control the cracking intensity.

The present invention has been made in consideration of the above-described circumstances, and an object of the present invention is to provide a cathode material for a lithium-ion secondary battery which suppresses the peeling of a carbonaceous film that coats the surfaces of primary particles of a cathode active material and is capable of improving the cathode density while guaranteeing the electron conductivity, a cathode for a lithium-ion secondary battery including the cathode material for a lithium-ion secondary battery, and a lithium-ion secondary battery including the cathode for a lithium-ion secondary battery.

The present inventors and the like carried out intensive studies in order to achieve the above-described object, consequently found that, in active material particles including central particles represented by General Formula $Li_xA_y$-

$D_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$) and a carbonaceous film that coats surfaces of the central particles, when a cathode material for a lithium-ion secondary battery is obtained by dissolving a mixture of the active material particles, a conductive auxiliary agent, and a binder in which a mixing ratio thereof is 94:1:5 in terms of a mass ratio in a solvent, and a viscosity is set to 5,000 mPa·s or less when a shear rate of paste having a total solid content amount of 45% by mass is 4.0 [1/s], it is possible to suppress the peeling of the carbonaceous film that coats the surfaces of primary particles of a cathode active material and provide a cathode material for a lithium-ion secondary battery capable of improving the cathode density while guaranteeing the electron conductivity, and completed the present invention.

A cathode material for a lithium-ion secondary battery of the first aspect of the present invention includes active material particles including central particles represented by General Formula $Li_xA_yD_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$) and a carbonaceous film that coats surfaces of the central particles, in which, when a mixture of the active material particles, a conductive auxiliary agent and a binder in which a mixing ratio thereof is 94:1:5 in terms of a mass ratio is dissolved in a solvent to form paste having a total solid content amount of 45% by mass, a viscosity of the past is 5,000 mPa·s or less at a shear rate of 4.0 [1/s].

It is preferable that the cathode material described above preferably has the following characteristics. The following characteristics may be combined with each other.

The cathode material for a lithium-ion secondary battery may consist of the active material particles.

The active material particles may consist of the central particles and the carbonaceous film that coats surfaces of the central particles.

The central particles may consist essentially of the compound represented by general formula $Li_xA_yD_zPO_4$.

A cathode for a lithium-ion secondary battery of the second aspect of the present invention is a cathode for a lithium-ion secondary battery including an electrode current collector and a cathode mixture layer formed on the electrode current collector, in which the cathode mixture layer includes the cathode material for a lithium-ion secondary battery of the present invention.

A lithium-ion secondary battery of the third aspect of the present invention includes the cathode for a lithium-ion secondary battery of the present invention.

EFFECTS OF THE INVENTION

According to the cathode material for a lithium-ion secondary battery of the present invention, since the cathode material for a lithium-ion secondary battery is obtained by dissolving the mixture of the active material particles, the conductive auxiliary agent, and the binder in which the mixing ratio thereof is 94:1:5 in terms of the mass ratio in the solvent, and the viscosity is 5,000 mPa·s or less when the shear rate of the paste having a total solid content amount of 45% by mass is 4.0 [1/s], it is possible to suppress the peeling of the carbonaceous film that coats the surfaces of the central particles and provide cathode materials for a lithium-ion secondary battery capable of improving the cathode density while guaranteeing the electron conductivity.

According to the cathode for a lithium-ion secondary battery of the present invention, since the cathode material for a lithium-ion secondary battery of the present invention is included, lithium-ion secondary batteries having a high energy density and excellent input and output characteristics can be obtained.

According to the lithium-ion secondary battery of the present invention, since the cathode for a lithium-ion secondary battery of the present invention is included, lithium-ion secondary batteries having a high energy density and excellent input and output characteristics can be obtained.

DETAILED DESCRIPTION OF THE INVENTION

Figure 1:
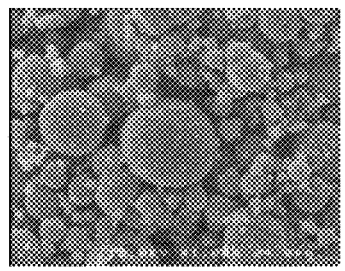
FIG. 1 is a scanning electron microscopic image illustrating agglomerates.

Preferable embodiments and preferable examples of a cathode material for a lithium-ion secondary battery, a cathode for a lithium-ion secondary battery, and a lithium-ion secondary battery of the present invention will be described below.

Meanwhile, the present embodiments are specific description for better understanding of the gist of the present invention and does not limit the present invention unless particularly otherwise described. Addition, omission, substitution, and other modification of the constitution are allowed within the scope of the present invention.

Cathode Material for Lithium-Ion Secondary Battery

In a cathode material for a lithium-ion secondary battery of the present embodiment (hereinafter, in some cases, simply referred to as "cathode material"), active material particles include central particles represented by General Formula $Li_xA_yD_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$) and a carbonaceous film that coats surfaces of the central particles, the cathode material for a lithium-ion secondary battery is obtained by dissolving a mixture of the active material particles, a conductive auxiliary agent, and a binder in which the mixing ratio thereof is 94:1:5 in terms of the mass ratio in a solvent, and the viscosity is 5,000 mPa·s or less when the shear rate of paste having a total solid content amount of 45% by mass is 4.0 [1/s].

The cathode material for a lithium-ion secondary battery of the present embodiment is obtained by dissolving a mixture of the active material particles, a conductive auxiliary agent, and a binder in which the mixing ratio thereof is 94:1:5 in terms of the mass ratio in a solvent, and, when the shear rate of the paste having a total solid content amount of 45% by mass is 4.0 [1/s], the viscosity is 5,000 mPa·s or less, preferably 4,000 mPa·s or less, and more preferably 3,000 mPa·s or less. Meanwhile, the lower limit of the viscosity when the shear rate of the paste is 4.0 [1/s] is not particularly limited and may be 1,000 mPa·s or more or 1,500 mPa·s or more.

In a case in which the viscosity exceeds 5,000 mPa·s when the shear rate of the paste is 4.0 [1/s], during the application of the cathode material paste to an electrode current collector, the electrode internal structure becomes uneven due to the variation of the coating thickness, and it becomes impossible to realize sufficient charge and discharge rate performance.

In the present embodiment, examples of a method for measuring the viscosity of the paste include a method in which a dynamic viscoelasticity measurement instrument (Model No.: RS-6000, manufactured by Thermo Fisher Scientific Inc.) is used, the measurement temperature is 25° C., the shear rate is increased in a range from 0.01 [1/s] to 20 [1/s], and the viscosity is scanned at an arbitrary shear rate.

The powder resistance value of the cathode material for a lithium-ion secondary battery is preferably 100 Ω·cm or less and more preferably 80 Ω·cm or less.

When the powder resistance value is 100 Ω·cm or less, it is possible to improve the electron conductivity of the cathode material and a cathode mixture layer formed on the electrode current collector.

The powder resistance value can be measured from a specimen obtained by shaping the cathode material at a pressure of 50 MPa and, specifically, can be measured using a method described in examples.

The average primary particle diameter of the cathode material (active material particles) for a lithium-ion secondary battery of the present embodiment is preferably 10 nm or more and 400 nm or less and more preferably 20 nm or more and 300 nm or less.

When the average primary particle diameter of the cathode material is 10 nm or more, the specific surface area of the cathode material increases, and thus an increase in the mass of necessary carbon is suppressed, and it is possible to suppress a decrease in the charge and discharge capacity of lithium-ion secondary batteries. Meanwhile, when the average primary particle diameter of the cathode material is 400 nm or less, it is possible to suppress the extension of time for lithium ions or electrons to migrate in the cathode material. Therefore, it is possible to suppress an increase in the internal resistance of lithium-ion secondary batteries and the consequent deterioration of the output characteristics.

Here, the average particle diameter refers to the volume-average particle diameter. The average primary particle diameter of the primary particles of the cathode material can be measured using a laser diffraction and scattering particle size distribution measurement instrument. In addition, it is also possible to arbitrarily select a plurality of primary particles observed using a scanning electron microscope (SEM) and calculate the average particle diameter of the primary particles.

The BET specific surface area of the cathode material for a lithium-ion secondary battery is preferably 5 $m^2/g$ or more and 25 $m^2/g$ or less.

When the BET specific surface area is 5 $m^2/g$ or more, the coarsening of the cathode material is suppressed, and it is possible to increase the diffusion rate of lithium ions in the particles. Therefore, it is possible to improve the battery characteristics of lithium-ion secondary batteries. Meanwhile, when the BET specific surface area is 25 $m^2/g$ or less, it is possible to increase the cathode density in cathodes including the cathode material for a lithium-ion secondary battery of the present embodiment. Therefore, it is possible to provide lithium-ion secondary batteries having a high energy density.

The BET specific surface area of the cathode material for a lithium-ion secondary battery can be measured using a method described in the examples.

The amount of carbon included in the cathode material for a lithium-ion secondary battery, that is, the amount of carbon forming the carbonaceous film is preferably 0.1 parts by mass or more and 10 parts by mass or less and more preferably 0.6 parts by mass or more and 3 parts by mass or less with respect to 100 parts by mass of the central particles.

When the amount of carbon is 0.1 parts by mass or more, the discharge capacity at a high charge-discharge rate of lithium-ion secondary batteries increases, and it is possible to realize sufficient charge and discharge rate performance. Meanwhile, when the amount of carbon is 10 parts by mass or less, it is possible to suppress the battery capacity of lithium-ion secondary batteries per unit mass of the cathode material being decreased more than necessary.

The amount of carbon included in the cathode material for a lithium-ion secondary battery can be measured using a method described in the examples.

Figure 2:
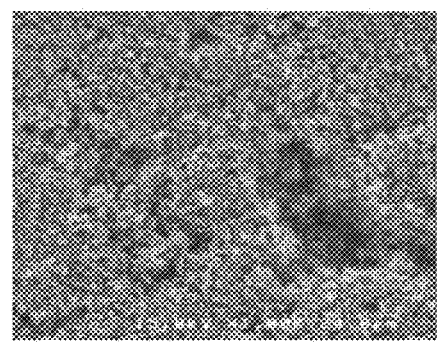
FIG. 2 is a scanning electron microscopic image illustrating cracked particles.

In addition, the cathode material for a lithium-ion secondary battery of the present embodiment is cracked particles which are produced using a method for manufacturing a cathode material for a lithium-ion secondary battery described below and are formed by cracking active material particles made of agglomerates of primary particles. In the cathode material for a lithium-ion secondary battery of the present embodiment, the agglomerate refers to a substance allowing the differentiation of individual secondary particles in particle shapes observed using a scanning electron microscope (SEM) at a magnification of 1,000 times as illustrated in FIG. 1. On the other hand, the cracked particles refer to a substance in a state in which the differentiation of individual particles is not allowed in particle shapes observed using a scanning electron microscope (SEM) at a magnification of 1,000 times as illustrated in FIG. 2.

The cathode material for a lithium-ion secondary battery of the present embodiment has a peak (maximum) of coarse particles and a peak (maximum) of fine particles in the particle size distribution.

The particle size distribution of the cathode material for a lithium-ion secondary battery of the present invention may have one peak or two or more peaks, and preferably have two peaks. For example, when the particle size distribution has two peaks wherein one peak is included in a coarse particle side and one peak is included in a fine particle side, the particle size distribution may be divided by a valley position between two peaks into two parts, that is, said coarse particle side and fine particle side.

In the cathode material for a lithium-ion secondary battery of the present embodiment, the ratio (coarse particle ratio) of an area surrounded by a curve indicating the peak (maximum) shape of the coarse particles (coarse particle-side peak area) to the sum of the area surrounded by the curve indicating the peak (maximum) shape of the coarse particles and an area surrounded by a curve indicating the peak (maximum) shape of the fine particles (fine particle-side peak area) is preferably 35% or more and 65% or less and more preferably 40% or more and 60% or less.

When the coarse particle ratio is 35% or more, the peeling of the carbonaceous film is suppressed, and thus the electron conductivity of the cathode material improves, and it is possible to realize sufficient charge and discharge rate performance. When the coarse particle ratio is 65% or less, it becomes possible to densely fill cathodes with the cathode active material (central particles) during the production of the cathodes including the cathode material for a lithium-ion secondary battery, and the energy density per unit volume of the cathodes improves.

The coarse particle ratio in the particle size distribution can be measured using a laser diffraction and scattering particle size distribution measurement instrument or the like and can be calculated from the peak area on the coarse particle side and the peak area on the fine particle side of a bimodal particle size distribution.

The median diameter of the cathode material for a lithium-ion secondary battery is preferably 0.50 µm or more and 0.80 µm or less and more preferably 0.55 µm or more and 0.75 µm or less.

When the median diameter is 0.50 µm or more, it is possible to prevent the degradation of the electron conductivity caused by excess cracking. Meanwhile, when the median diameter is 0.80 µm or less, it becomes possible to densely fill cathodes with the cathode active material (central particles) during the production of the cathodes including the cathode material for a lithium-ion secondary battery, and the energy density per unit volume improves.

The median diameter refers to the particle diameter at a point at which the distribution curve of the integral percentage in the particle size distribution intersects the horizontal axis at 50%.

The median diameter of the cathode material for a lithium-ion secondary battery can be measured using a method described in the examples.

In addition, the coarse particle ratio of the cathode material for a lithium-ion secondary battery can be measured using a method described in the examples.

The cathode material for a lithium-ion secondary battery of the present embodiment is a cathode material which is produced using a method for manufacturing a cathode material for a lithium-ion secondary battery described below and is formed by cracking active material particles made of the agglomerates of primary particles, and the maximum value of the fine particles in the particle size distribution is preferably 0.15 µm or more and 0.35 µm or less and more preferably 0.18 µm or more and 0.32 µm or less.

When the maximum value of the fine particles in the particle size distribution is 0.15 µm or more and 0.35 µm or less, the electron conductivity of the cathode material in which the peeling of the carbonaceous film that coats the surfaces of the primary particles of the central particles is suppressed improves.

The maximum value of the coarse particles in the particle size distribution of the cathode material for a lithium-ion secondary battery is preferably 0.80 µm or more and 1.20 µm or less and more preferably 0.85 µm or more and 1.15 µm or less.

When the maximum value of the coarse particles in the particle size distribution is 0.80 µm or more and 1.20 µm or less, it becomes possible to densely fill cathodes with the cathode material during the production of the cathodes including the cathode material for a lithium-ion secondary battery, and the energy density per unit volume of the cathodes improves.

The chromaticity b* in the L*a*b* color space of the cathode material for a lithium-ion secondary battery is preferably 1.9 or more and 2.3 or less and more preferably 1.95 or more and 2.3 or less.

The chromaticity b* of the cathode material for a lithium-ion secondary battery is an index indicating the degree of coating of the central particles with the carbonaceous film.

When the chromaticity b* is 1.9 or more, it becomes possible to densely fill cathodes with the cathode active material (central particles) during the production of the cathodes including the cathode material for a lithium-ion secondary battery, and the energy density per unit volume improves. Meanwhile, when the chromaticity b* is 2.3 or less, in the cathode material for a lithium-ion secondary battery, it is possible to set the degree of exposure of central particles that are not coated with the carbonaceous film in a range enough to increase the energy density per unit volume, and it is possible to prevent the electron conductivity from being decreased due to excessive cracking.

The chromaticity b* in the L*a*b* color space of the cathode material for a lithium-ion secondary battery can be measured using a method described in the examples.

The proportion of the amount of carbon in the specific surface area of the cathode material for a lithium-ion secondary battery ("[the amount of carbon]/[the specific surface area of the cathode material]"; hereinafter, referred to as "carbon supporting amount ratio") is preferably 0.05 mass·/m² or more and 0.15 mass·g/m² or less and more preferably 0.06 mass·g/m² or more and 0.13 mass·g/m² or less.

When the carbon supporting amount ratio is 0.05 mass·g/m² or more, the discharge capacity at a high charge-discharge rate of lithium-ion secondary batteries increases, and it is possible to realize sufficient charge and discharge rate performance. Meanwhile, when the carbon supporting amount ratio is 0.15 mass·g/m² or less, it is possible to suppress the battery capacity of lithium-ion secondary batteries per unit mass of the cathode material being decreased more than necessary.

Central Particles

The central particles constituting the cathode material for a lithium-ion secondary battery of the present embodiment are made of a cathode active material represented by General Formula $Li_xA_yD_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$).

Examples of compounds represented by General Formula $Li_xA_yD_zPO_4$ include $LiFePO_4$, $LiMnPO_4$, $LiCoPO_4$, $LiFeMnPO_4$, $LiMnZnPO_4$, and the like.

The average primary particle diameter of the primary particles of the central particles constituting the cathode material particles for a lithium-ion secondary battery of the present embodiment is preferably 5 nm or more and 800 nm or less and more preferably 20 nm or more and 500 nm or less.

When the average primary particle diameter of the primary particles of the central particles is 5 nm or more, it is possible to sufficiently coat the surfaces of the primary particles of the central particles with the carbonaceous film. In addition, it is possible to increase the discharge capacity of lithium-ion secondary batteries during high-speed charge and discharge and realize sufficient charge and discharge performance. Meanwhile, when the average primary particle diameter of the primary particles of the central particles is 800 nm or less, it is possible to decrease the internal resistance of the primary particles of the central particles. In addition, it is possible to increase the discharge capacity of lithium-ion secondary batteries during high-speed charge and discharge.

Carbonaceous Film

The carbonaceous film coats the surfaces of the central particles.

When the surfaces of the central particles are coated with the carbonaceous film, it is possible to improve the electron conductivity of the cathode material for a lithium-ion secondary battery.

The carbonaceous film is a pyrolytic carbonaceous film derived from a thermally treated organic compound, and the thickness of the carbonaceous film is preferably 0.2 nm or more and 10 nm or less and more preferably 0.5 nm or more and 4 nm or less.

When the thickness of the carbonaceous film is 0.2 nm or more, it is possible to prevent the excessively thin thickness of the carbonaceous film from disabling the formation of films having a desired resistance value. In addition, it is possible to ensure a conduction property suitable for the cathode material for a lithium-ion secondary battery. Meanwhile, when the thickness of the carbonaceous film is 10 nm or less, it is possible to suppress a decrease in the battery capacity per unit mass of the cathode material for a lithium-ion secondary battery.

In addition, when the thickness of the carbonaceous film is 0.2 nm or more and 10 nm or less, it becomes easy to closely pack the cathode material for a lithium-ion secondary battery, and thus the amount of the cathode material for a lithium-ion secondary battery packed per unit volume of the cathode increases. As a result, it is possible to increase the cathode density, and high-capacity lithium-ion secondary batteries can be obtained.

The coating ratio of the carbonaceous film to the central particles is preferably 60% or more and 95% or less and more preferably 80% or more and 95% or less. When the coating ratio of the carbonaceous film is 60% or more, the coating effect of the carbonaceous film can be sufficiently obtained.

The density of the carbonaceous film, which is calculated using the carbon component in the carbonaceous film, is preferably 0.3 g/cm$^3$ or more and 1.5 g/cm$^3$ or less and more preferably 0.4 g/cm$^3$ or more and 1.0 g/cm$^3$ or less.

Here, the reasons for limiting the density of the carbonaceous film, which is calculated using the carbon amount in the carbonaceous film, to the above-described range are as described below. When the density of the carbonaceous film, which is calculated using the carbon amount in the carbonaceous film, is 0.3 g/cm$^3$ or more, the carbonaceous film exhibits sufficient electron conductivity. Meanwhile, when the density of the carbonaceous film is 1.5 g/cm$^3$ or less, the amount of the fine crystals of graphite made of a lamellar structure included in the carbonaceous film is small, and thus no steric hindrance is generated by the fine crystals of the graphite during the diffusion of lithium ions in the carbonaceous film. Therefore, there are no cases in which the lithium ion migration resistance increases. As a result, there are no cases in which the internal resistance of lithium-ion secondary batteries increases, and voltage drop does not occur at a high charge-discharge rate of lithium-ion secondary batteries.

According to the cathode material for a lithium-ion secondary battery of the present embodiment, the active material particles includes the central particles represented by General Formula $Li_xA_yD_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$) and the carbonaceous film that coats the surfaces of the central particles, the cathode material for a lithium-ion secondary battery is obtained by dissolving the mixture of the active material particles, the conductive auxiliary agent, and the binder in which the mixing ratio thereof is 94:1:5 in terms of the mass ratio in the solvent, and the viscosity is set to 5,000 mPa·s or less when the shear rate of the paste having a total solid content amount of 45% by mass is 4.0 [1/s], and thus it is possible to suppress the peeling of the carbonaceous film that coats the surfaces of the primary particles of the cathode active material (central particles) and provide cathode materials for a lithium-ion secondary battery capable of improving the cathode density while guaranteeing the electron conductivity.

Method for Manufacturing Cathode Material for Lithium-Ion Secondary Battery

The cathode material for a lithium-ion secondary battery of the present embodiment can be manufactured by cracking active material particles made of agglomerates.

Method for Manufacturing Active Material Particles

A method for manufacturing active material particles in the present embodiment includes, for example, a manufacturing step of the central particles and a precursor of the central particles, a slurry preparation step of preparing a slurry by mixing at least one central particle raw material selected from the group consisting of the central particles and the precursor of the central particles, an organic compound which is a carbonaceous film precursor, and water, and a calcination step of drying the slurry and calcinating the obtained dried substance in a non-oxidative atmosphere.

Step of Manufacturing Central Particles and Precursor of Central Particles

As a method for manufacturing the compound (the central particles) represented by General Formula $Li_xA_yD_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$), a method of the related art such as a solid phase method, a liquid phase method, or a gas phase method is used. Examples of $Li_xA_yD_zPO_4$ obtained using the above-described method include particulate substances (hereinafter, in some cases, referred to as "$Li_xA_yD_zPO_4$ particles").

The $Li_xA_yD_zPO_4$ particles are obtained by, for example, hydrothermally synthesizing a slurry-form mixture obtained by mixing a Li source, an A source, a P source, water, and, if necessary, a D source. By means of the hydrothermal synthesis, $Li_xA_yD_zPO_4$ is generated as a precipitate in water. The obtained precipitate may be a precursor of $Li_xA_yD_zPO_4$. In this case, target $Li_xA_yD_zPO_4$ particles are obtained by calcinating the precursor of $Li_xA_yD_zPO_4$.

In this hydrothermal synthesis, a pressure-resistant airtight container is preferably used.

Here, examples of the Li source include lithium salts such as lithium acetate ($LiCH_3COO$) and lithium chloride (LiCl), lithium hydroxide (LiOH), and the like. Among these, as the Li source, at least one selected from the group consisting of lithium acetate, lithium chloride, and lithium hydroxide is preferably used.

Examples of the A source include chlorides, carboxylates, sulfates, and the like which include at least one element selected from the group consisting of Co, Mn, Ni, Fe, Cu, and Cr. For example, in a case in which A in $Li_xA_yD_zPO_4$ is Fe, examples of the Fe source include divalent iron salts such as iron (II) chloride ($FeCl_2$), iron (II) acetate (Fe($CH_3COO$)$_2$), and iron (II) sulfate ($FeSO_4$). Among these, as the Fe source, at least one selected from the group consisting of iron (II) chloride, iron (II) acetate, and iron (II) sulfate is preferably used.

Examples of the D source include chlorides, carboxylates, sulfates, and the like which include at least one element selected from the group consisting of Mg, Ca, Sr, Ba, Ti, Zn, B, Al, Ga, In, Si, Ge, Sc, and Y.

Examples of the P source include phosphoric acid compounds such as phosphoric acid ($H_3PO_4$), ammonium dihydrogen phosphate ($NH_4H_2PO_4$), diammonium hydrogen phosphate (($NH_4)_2HPO_4$), and the like. Among these, as the P source, at least one selected from the group consisting of phosphonic acid, ammonium dihydrogen phosphate, and diammonium hydrogen phosphate is preferably used.

Slurry Preparation Step

By means of the slurry preparation step, the organic compound which is the precursor of the carbonaceous film is interposed among the central particles, and the organic compound and the central particles are uniformly mixed together, and thus the surfaces of the central particles can be uniformly coated with the organic compound.

Furthermore, by means of the calcination step, the organic compound that coats the surfaces of the central particles is carbonized, thereby obtaining active material particles (cathode material) including the central particles that are uniformly coated with the carbonaceous film.

The organic compound that is used in the method for manufacturing active material particles in the present embodiment is not particularly limited as long as the compound is capable of forming the carbonaceous film on the surfaces of the central particles. Examples of the above-described organic compound include divalent alcohols such as polyvinyl alcohol (PVA), polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyethers, and ethylene glycol, trivalent alcohols such as glycerin, and the like.

In the slurry preparation step, the central particle raw material and the organic compound are dissolved or dispersed in water, thereby preparing a homogeneous slurry.

In the dissolution or dispersion of these raw materials in water, it is also possible to add a dispersant thereto.

A method for dissolving or dispersing the central particle raw material and the organic compound in water is not particularly limited as long as the central particle raw material is dispersed in water and the organic compound is dissolved or dispersed in water. The above-described method is preferably a method in which a medium stirring-type dispersion device that stirs medium particles at a high rate such as a planetary ball mill, an oscillation ball mill, a bead mill, a paint shaker, or an attritor is used.

When the central particle raw material and the organic compound are dissolved or dispersed in water, it is preferable to disperse the central particle raw material in water in a primary particle form, then, add the organic compound to water, and stir the organic compound so as to be dissolved or dispersed. In such a case, the surfaces of the primary particles of the central particle raw material are easily coated with the organic compound. Therefore, the organic compound is uniformly dispersed on the surfaces of the primary particles of the central particle raw material, and consequently, the surfaces of the primary particles of the central particles are coated with the carbonaceous film derived from the organic compound.

Calcination Step

Next, the slurry prepared in the slurry preparation step is sprayed and dried in a high-temperature atmosphere, for example, in the atmosphere of 70° C. or higher and 250° C. or lower.

Next, the obtained dried substance is calcinated in a non-oxidative atmosphere at a temperature of preferably 500° C. or higher and 1,000° C. or lower and more preferably 600° C. or higher and 1,000° C. or lower for 0.1 hours or longer and 40 hours or shorter.

The non-oxidative atmosphere is preferably an atmosphere filled with an inert gas such as nitrogen ($N_2$), argon (Ar), or the like. In a case in which it is necessary to further suppress the oxidation of the dried substance, a reducing atmosphere including approximately several percentages by volume of a reducing gas such as hydrogen ($H_2$) is preferred. In addition, for the purpose of removing organic components evaporated in the non-oxidative atmosphere during the calcination, a susceptible or burnable gas such as oxygen ($O_2$) may be introduced into the non-oxidative atmosphere.

Here, when the calcination temperature is set to 500° C. or higher, it is easy for the organic compound in the dried substance to be sufficiently decomposed and reacted, and the organic compound is easily and sufficiently carbonized. As a result, it is easy to prevent the generation of a high-resistance decomposed substance of the organic compound in the obtained agglomerates. Meanwhile, when the calcination temperature is set to 1,000° C. or lower, lithium (Li) in the central particle raw material is not easily evaporated, and the particle growth of the central particles to a size that is equal to or larger than the target size is suppressed. As a result, in a case in which lithium-ion secondary batteries including a cathode including the cathode material of the present embodiment are produced, it is possible to prevent the discharge capacity at a high charge-discharge rate from being decreased, and it is possible to realize lithium-ion secondary batteries having sufficient charge and discharge rate performance.

By means of the above-described steps, active material particles made of agglomerates in which the surfaces of the primary particles of the central particles are coated with a pyrolytic carbonaceous film generated by the thermal decomposition of the organic compound in the dried substance are obtained.

Cracking Step of Active Material Particles

Next, at least some of the active material particles made of the agglomerates are cracked. Here, in order to "crack at least some of the active material particles made of the agglomerates", at least some of the agglomerates need to be cracked, and not all of the agglomerates need to be cracked.

A device that is used for the cracking of the agglomerates needs to be capable of cracking not all of the agglomerates but some of the agglomerates, and, for example, an air flow-type fine crusher such as a dry-type ball mill, a wet-type ball mill, a mixer, or a jet mill, an ultrasonic crusher, or the like is used.

In the present embodiment, a jet mill is preferably used for the cracking since the damage of the active material particles (the central particles and the primary particles) is suppressed.

In addition, the supply rate of the agglomerates into the jet mill is preferably set to 50 g/hour or more and 1,500 g/hour or less, and the air pressure is preferably set to 0.3 MPa or more and 0.7 MPa or less. The cracking intensity can be freely adjusted by varying the supply rate of the agglomerates being injected into the jet mill. In addition, the coarse particle ratio in the particle size distribution of the cathode material for a lithium-ion secondary battery can be adjusted by adjusting the cracking intensity. Here, in a case in which the cracking intensity is strong, the coarse particle ratio becomes a small value, and the degree of exposure of central particles that are not coated with the carbonaceous film increases in the cathode material for a lithium-ion secondary battery. Meanwhile, the cracking intensity refers to the supply rate (g/hour) of the agglomerates when the above-described air pressure is fixed in the case of using, for example, a jet mill, and the cracking intensity becomes stronger as the supply rate decreases and becomes weaker as the supply rate increases.

Cathode for Lithium-Ion Secondary Battery

A cathode for a lithium-ion secondary battery of the present embodiment (hereinafter, in some cases, referred to as "cathode") includes the cathode material for a lithium-ion secondary battery of the present embodiment. In more detail, the cathode of the present embodiment includes an electrode current collector made of a metal foil and a cathode mixture layer formed on the electrode current collector, and the cathode mixture layer includes the cathode material for a lithium-ion secondary battery of the present embodiment. That is, the cathode of the present embodiment is obtained by forming the cathode mixture layer on one main surface of the electrode current collector using the cathode material for a lithium-ion secondary battery of the present embodiment.

Since the cathode for a lithium-ion secondary battery of the present embodiment includes the cathode material for a lithium-ion secondary battery of the present embodiment, lithium-ion secondary batteries for which the cathode for a lithium-ion secondary battery of the present embodiment is used have a high energy density and have excellent input and output characteristics.

Method for Manufacturing Cathode for Lithium-Ion Secondary Battery

A method for manufacturing the cathode for a lithium-ion secondary battery of the present embodiment is not particularly limited as long as the cathode mixture layer can be formed on one main surface of the electrode current collector using the cathode material for a lithium-ion secondary battery of the present embodiment. Examples of the method for manufacturing the cathode of the present embodiment include the following method.

First, the cathode material for a lithium-ion secondary battery of the present embodiment, a binder made of a binder resin, and a solvent are mixed together, thereby preparing cathode material paste. At this time, to the cathode material paste in the present embodiment, a conductive auxiliary agent such as carbon black may be added if necessary.

Binder

As the binder, that is, the binder resin, for example, a polytetrafluoroethylene (PTFE) resin, a polyvinylidene fluoride (PVdF) resin, fluorine rubber, or the like is preferably used.

The blending amount of the binder used to prepare the cathode material paste is not particularly limited, but is, for example, preferably 1 part by mass or more and 30 parts by mass or less and more preferably 3 parts by mass or more and 20 parts by mass or less with respect to 100 parts by mass of the cathode material for a lithium-ion secondary battery.

When the blending amount of the binder is 1 part by mass or more, it is possible to sufficiently improve the binding property between the cathode mixture layer and the electrode current collector. Therefore, it is possible to prevent the cathode mixture layer from being cracked or dropped during the formation of the cathode mixture layer by means of rolling or the like. In addition, it is possible to prevent the cathode mixture layer from being peeled off from the electrode current collector in processes of charging and discharging lithium-ion secondary batteries and prevent the battery capacity or the charge-discharge rate from being decreased. Meanwhile, when the blending amount of the binder is 30 parts by mass or less, it is possible to prevent the internal resistance of the cathode material for a lithium-ion secondary battery from being decreased and prevent the battery capacity at a high charge-discharge rate from being decreased.

Conductive Auxiliary Agent

The conductive auxiliary agent is not particularly limited, and, for example, at least one element selected from the group consisting of particulate carbon such as acetylene black (AB), KETJEN BLACK, and furnace black and fibrous carbon such as vapor-grown carbon fiber (VGCF) and carbon nanotube is used.

Solvent

The solvent that is used in the cathode material paste including the cathode material for a lithium-ion secondary battery of the present embodiment is appropriately selected depending on the properties of the binder. When the solvent is appropriately selected, it is possible to facilitate the application of the cathode material paste to substances to be coated such as the electrode current collector.

Examples of the solvent include water, alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetylacetone, and cyclohexanone, amides such as dimethyl formamide, N,N-dimethylacetoacetamide, and N-methyl-2-pyrrolidinone (NMP), glycols such as ethylene glycol, diethylene glycol, and propylene glycol, and the like. These solvents may be used singly or in a mixture form of two or more solvents.

The content rate of the solvent in the cathode material paste is preferably 50% by mass or more and 70% by mass or less and more preferably 55% by mass or more and 65% by mass or less in a case in which the total mass of the cathode material for a lithium-ion secondary battery of the present embodiment, the binder, and the solvent is set to 100 parts by mass.

When the content rate of the solvent in the cathode material paste is in the above-described range, it is possible to obtain cathode material paste having excellent cathode formability and excellent battery characteristics.

A method for mixing the cathode material for a lithium-ion secondary battery of the present embodiment, the binder, the conductive auxiliary agent, and the solvent is not particularly limited as long as these components can be uniformly mixed together. Examples thereof include mixing methods in which a kneader such as a ball mill, a sand mill, a planetary (sun-and-planet) mixer, a paint shaker, or a homogenizer is used.

The cathode material paste is applied to one main surface of the electrode current collector so as to form a coated film, and then this coated film is dried, thereby obtaining an electrode current collector having a coated film made of the mixture of the cathode material and the binder formed on one main surface.

After that, the coated film is pressed by pressure and is dried, thereby obtaining a cathode having the cathode mixture layer on one main surface of the electrode current collector.

Lithium-Ion Secondary Battery

A lithium-ion secondary battery of the present embodiment includes a cathode, an anode, and a non-aqueous electrolyte, in which the cathode is the cathode for a lithium-ion secondary battery of the present embodiment. Specifically, the lithium-ion secondary battery of the present embodiment includes the cathode for a lithium-ion secondary battery of the present embodiment as a cathode, an anode, a separator, and a non-aqueous electrolyte.

In the lithium-ion secondary battery of the present embodiment, the anode, the non-aqueous electrolyte, and the separator are not particularly limited.

Anode

Examples of the anode include anodes including an anode material such as Li metal, carbon materials such as natural graphite and hard carbon, Li alloys, $Li_4Ti_5O_{12}$, $Si(Li_{4.4}Si)$, and the like.

Non-Aqueous Electrolyte

Examples of the non-aqueous electrolyte include non-aqueous electrolytes obtained by mixing ethylene carbonate (EC) and ethyl methyl carbonate (EMC) so that the volume ratio reaches 1:1 and dissolving lithium hexafluorophosphate ($LiPF_6$) in the obtained solvent mixture so that the concentration reaches 1 mol/dm³.

Separator

As the separator, it is possible to use, for example, porous propylene.

In addition, instead of the non-aqueous electrolyte and the separator, a solid electrolyte may be used.

Since the lithium-ion secondary battery of the present embodiment includes the cathode for a lithium-ion secondary battery of the present embodiment as the cathode, the lithium-ion secondary battery has a high energy density and has excellent input and output characteristics.

EXAMPLES

Hereinafter, the present invention will be more specifically described using examples and comparative examples, but the present invention is not limited to the following examples.

Example 1

Synthesis of Cathode Material for Lithium-Ion secondary Battery

Lithium phosphate ($Li_3PO_4$) (2 mol) and iron (II) sulfate ($FeSO_4$) (2 mol) were added to and mixed with water so that the total amount reached 4 L, thereby preparing a homogeneous slurry-form mixture.

Next, this mixture was stored in a pressure-resistant airtight container having a capacity of 8 L and was hydrothermally synthesized at 200° C. for four hours, thereby generating a precipitate of a cathode active material.

Next, this precipitate was cleaned with water, thereby obtaining a cake-form cathode active material.

Next, a polyethylene glycol (20 g) was added as an organic compound to the cathode active material (150 g in terms of solid content), and a dispersion treatment was carried out on a mixture thereof using zirconia balls having a diameter of 5 mm as medium particles in a bead mill for two hours, thereby preparing a homogeneous slurry.

Next, this slurry was sprayed and dried in the atmosphere at 200° C., thereby obtaining agglomerates of a cathode material which had an average particle diameter of 8.5 μm and were coated with an organic substance.

Next, the obtained agglomerates were calcinated in a nitrogen atmosphere for three hours at 700° C., thereby obtaining agglomerates of the cathode active material which had an average particle diameter of 8.5 μm and were coated with a carbonaceous film.

Cracking of Agglomerates

The above-described agglomerates were cracked using a jet mill device (trade name: SJ-100, manufactured by Nisshin Engineering Inc.) under a condition of a supply rate of 200 g/hour, thereby obtaining a cathode material 1 of Example 1.

Production of Lithium-Ion Secondary Battery

The cathode material 1, polyvinylidene fluoride (PVdF) as a binder, and acetylene black (AB) as a conductive auxiliary agent were mixed into N-methyl-2-pyrrolidinone (NMP) which was a solvent so that the mass ratio (the cathode material 1:AB:PVdF) in paste reached 94:1:5 and, furthermore, the total solid content amount of the paste reached 45% by mass, and the components were kneaded using a kneader (trade name: THINKY MIXER, manufactured by Thinky Corporation) for 30 minutes under conditions of a revolution rate of 1,200 rpm and a rotation rate of 800 rpm, thereby preparing cathode material paste (for the cathode).

This cathode material paste (for the cathode) was applied onto the surface of a 30 μm-thick aluminum foil (electrode current collector) so as to form a coated film, and the coated film was dried, thereby forming a cathode mixture layer on the surface of the aluminum foil.

After that, the cathode mixture layer was pressed at a pressure of 58.84 MPa, thereby producing a cathode 1 of Example 1.

A lithium metal was disposed as an anode with respect to this cathode 1, and a separator made of porous polypropylene was disposed between the cathode 1 and the anode, thereby producing a member for a battery 1.

Meanwhile, ethylene carbonate and diethyl carbonate were mixed together in a mass ratio of 1:1, and furthermore, 1 mol/L of a $LiPF_6$ solution was added thereto, thereby producing an electrolyte solution 1 having lithium ion conductivity.

Next, the member for a battery 1 was immersed in the electrolyte solution 1, thereby producing a lithium-ion secondary battery 1 of Example 1.

Example 2

A cathode material 2 of Example 2 was obtained in the same manner as in Example 1 except for the fact that the agglomerates were cracked at a supply rate of 180 g/hour.

A lithium-ion secondary battery 2 of Example 2 was produced in the same manner as in Example 1 except for the fact that the cathode material 2 was used.

Example 3

A cathode material 3 of Example 3 was obtained in the same manner as in Example 1 except for the fact that the agglomerates were cracked at a supply rate of 150 g/hour.

A lithium-ion secondary battery 3 of Example 3 was produced in the same manner as in Example 1 except for the fact that the cathode material 3 was used.

Example 4

A cathode material 4 of Example 4 was obtained in the same manner as in Example 1 except for the fact that the agglomerates were cracked at a supply rate of 120 g/hour.

A lithium-ion secondary battery 4 of Example 4 was produced in the same manner as in Example 1 except for the fact that the cathode material 4 was used.

Example 5

A cathode material 5 of Example 5 was obtained in the same manner as in Example 1 except for the fact that the agglomerates were cracked at a supply rate of 100 g/hour.

A lithium-ion secondary battery 5 of Example 5 was produced in the same manner as in Example 1 except for the fact that the cathode material 5 was used.

Example 6

A cathode material 6 of Example 6 was obtained in the same manner as in Example 1 except for the fact that the agglomerates were cracked at a supply rate of 90 g/hour.

A lithium-ion secondary battery 6 of Example 6 was produced in the same manner as in Example 1 except for the fact that the cathode material 6 was used.

Example 7

Synthesis of Cathode Material for Lithium-Ion Secondary Battery

Lithium phosphate ($Li_3PO_4$) (2 mol) and iron (II) sulfate ($FeSO_4$) (2 mol) were added to and mixed with water so that the total amount reached 4 L, thereby preparing a homogeneous slurry-form mixture.

Next, this mixture was stored in a pressure-resistant airtight container having a capacity of 8 L and was hydrothermally synthesized at 200° C. for 24 hours, thereby generating a precipitate of a cathode active material.

Next, this precipitate was cleaned with water, thereby obtaining a cake-form cathode active material.

Next, a polyethylene glycol (20 g) was added as an organic compound to the cathode active material (150 g in terms of solid content), and a dispersion treatment was carried out on a mixture thereof using zirconia balls having a diameter of 5 mm as medium particles in a bead mill for two hours, thereby preparing a homogeneous slurry.

Next, this slurry was sprayed and dried in the atmosphere at 200° C., thereby obtaining agglomerates of a cathode material which had an average particle diameter of 8.3 μm and were coated with an organic substance.

Next, the obtained agglomerates were calcinated in a nitrogen atmosphere for three hours at 700° C., thereby obtaining agglomerates of the cathode active material which had an average particle diameter of 8.3 μm and were coated with a carbonaceous film.

Cracking of Agglomerates

The above-described agglomerates were cracked using a jet mill device (trade name: SJ-100, manufactured by Nisshin Engineering Inc.) under a condition of a supply rate of 100 g/hour, thereby obtaining a cathode material 7 of Example 7.

A lithium-ion secondary battery 7 of Example 7 was produced in the same manner as in Example 1 except for the fact that the cathode material 7 was used.

Example 8

Synthesis of Cathode Material for Lithium-Ion Secondary Battery

Lithium phosphate ($Li_3PO_4$) (2 mol) and iron (II) sulfate ($FeSO_4$) (2 mol) were added to and mixed with water so that the total amount reached 4 L, thereby preparing a homogeneous slurry-form mixture.

Next, this mixture was stored in a pressure-resistant airtight container having a capacity of 8 L and was hydrothermally synthesized at 160° C. for two hours, thereby generating a precipitate of a cathode active material.

Next, this precipitate was cleaned with water, thereby obtaining a cake-form cathode active material.

Next, a polyethylene glycol (20 g) was added as an organic compound to the cathode active material (150 g in terms of solid content), and a dispersion treatment was carried out on a mixture thereof using zirconia balls having a diameter of 5 mm as medium particles in a bead mill for two hours, thereby preparing a homogeneous slurry.

Next, this slurry was sprayed and dried in the atmosphere at 200° C., thereby obtaining agglomerates of a cathode material which had an average particle diameter of 8.9 μm and were coated with an organic substance.

Next, the obtained agglomerates were calcinated in a nitrogen atmosphere for three hours at 700° C., thereby obtaining agglomerates of the cathode active material which had an average particle diameter of 8.9 μm and were coated with a carbonaceous film.

Cracking of Agglomerates

The above-described agglomerates were cracked using a jet mill device (manufactured by Nisshin Engineering Inc., trade name: SJ-100) under a condition of a supply rate of 90 g/hour, thereby obtaining a cathode material 8 of Example 8.

A lithium-ion secondary battery 8 of Example 8 was produced in the same manner as in Example 1 except for the fact that the cathode material 8 was used.

Example 9

Synthesis of Cathode Material for Lithium-Ion Secondary Battery

Lithium phosphate ($Li_3PO_4$) (2 mol) and iron (II) sulfate ($FeSO_4$) (2 mol) were added to and mixed with water so that the total amount reached 4 L, thereby preparing a homogeneous slurry-form mixture.

Next, this mixture was stored in a pressure-resistant airtight container having a capacity of 8 L and was hydrothermally synthesized at 120° C. for five hours, thereby generating a precipitate of a cathode active material.

Next, this precipitate was cleaned with water, thereby obtaining a cake-form cathode active material.

Next, a polyethylene glycol (20 g) was added as an organic compound to the cathode active material (150 g in terms of solid content), and a dispersion treatment was carried out on a mixture thereof using zirconia balls having a diameter of 5 mm as medium particles in a bead mill for two hours, thereby preparing a homogeneous slurry.

Next, this slurry was sprayed and dried in the atmosphere at 200° C., thereby obtaining agglomerates of the cathode material which had an average particle diameter of 9.1 μm and were coated with an organic substance.

Next, the obtained agglomerates were calcinated in a nitrogen atmosphere for three hours at 700° C., thereby obtaining agglomerates of the cathode active material which had an average particle diameter of 9.1 μmm and were coated with a carbonaceous film.

Cracking of Agglomerates

The above-described agglomerates were cracked using a jet mill device (manufactured by Nisshin Engineering Inc., trade name: SJ-100) under a condition of a supply rate of 80 g/hour, thereby obtaining a cathode material 9 of Example 9.

A lithium-ion secondary battery 9 of Example 9 was produced in the same manner as in Example 1 except for the fact that the cathode material 9 was used.

Comparative Example 1

A cathode material 10 of Comparative Example 1 was obtained in the same manner as in Example 1 except for the fact that the agglomerates were cracked at a supply rate of 280 g/hour.

A lithium-ion secondary battery 10 of Comparative Example 1 was produced in the same manner as in Example 1 except for the fact that the cathode material 10 was used.

Comparative Example 2

A cathode material 11 of Comparative Example 2 was obtained in the same manner as in Example 1 except for the fact that the agglomerates were cracked at a supply rate of 250 g/hour.

A lithium-ion secondary battery 11 of Comparative Example 2 was produced in the same manner as in Example 1 except for the fact that the cathode material 11 was used.

Comparative Example 3

A cathode material 12 of Comparative Example 3 was obtained in the same manner as in Example 1 except for the fact that the agglomerates were not cracked.

A lithium-ion secondary battery 12 of Comparative Example 3 was produced in the same manner as in Example 1 except for the fact that the cathode material 12 was used.

Comparative Example 4

A cathode material 13 of Comparative Example 4 was obtained in the same manner as in Example 7 except for the fact that the agglomerates were not cracked.

A lithium-ion secondary battery 13 of Comparative Example 4 was produced in the same manner as in Example 1 except for the fact that the cathode material 13 was used.

Comparative Example 5

A cathode material 14 of Comparative Example 5 was obtained in the same manner as in Example 8 except for the fact that the agglomerates were cracked at a supply rate of 65 g/hour.

A lithium-ion secondary battery 14 of Comparative Example 5 was produced in the same manner as in Example 1 except for the fact that the cathode material 14 was used.

Comparative Example 6

A cathode material 15 of Comparative Example 6 was obtained in the same manner as in Example 9 except for the fact that the agglomerates were cracked at a supply rate of 55 g/hour.

A lithium-ion secondary battery 15 of Comparative Example 6 was produced in the same manner as in Example 1 except for the fact that the cathode material 15 was used.

Evaluation of Cathode Material for Lithium-Ion Secondary Battery

The cathode materials for a lithium-ion secondary battery and the lithium-ion secondary batteries of Example 1 to Example 9 and Comparative Example 1 to Comparative Example 6 were evaluated as described below.

1. BET Specific Surface Area

The BET specific surface area of the cathode material for a lithium-ion secondary battery was measured using a measurement device (trade name: HM model-1208, manufactured by Mountech Co., Ltd.) and a one-point method at a relative pressure of 0.29 ($P/P_0$).

2. Amount of Carbon

The amount of carbon in the cathode material for a lithium-ion secondary battery was measured using a carbon/sulfur analyzer (trade name: EMIA-220V, manufactured by Horiba Ltd.).

3. Powder Resistance Value

The powder resistance value of the cathode material for a lithium-ion secondary battery was measured using a specimen produced by injecting the cathode material into a die and shaping the cathode material at a pressure of 50 MPa, a low resistivity meter (trade name: Loresta-GP, manufactured by Mitsubishi Chemical Corporation), and a four point measurement at 25° C.

4. Median Diameter

The median diameter of the cathode material for a lithium-ion secondary battery was measured using the following method.

The median diameter was measured using a measurement device (trade name: LA-950V2, manufactured by Horiba Ltd.).

First, pure water (40 g) and polyvinyl pyrrolidone (PVP) (0.12 g) as a dispersion liquids and the cathode material for a lithium-ion secondary battery (0.04 g) as specimen powder were weighed in a 70 mL mayonnaise bottle. This mayonnaise bottle was manually shaken approximately ten times so as to mix the specimen powder and the dispersion liquids well.

Next, the mixed solution of the specimen powder and the dispersion liquids was treated with ultrasonic waves for two minutes under conditions of an output of 5 and a pulse of 50% in an ultrasonic homogenizer (trade name: SONI-FIER450, manufactured by Branson Ultrasonics, Emersion Japan, Ltd.), and the median diameter was measured using the obtained dispersion solution. The median diameter refers to the particle diameter at a point at which the distribution curve of the integral percentage in the particle size distribution intersects the horizontal axis of 50% and was thus calculated on the basis of the measurement result of the particle size distribution of the cathode material for a lithium-ion secondary battery.

The median diameter was measured with the data loading number set to 5,000 for a semiconductor laser (LD) and 1,000 for a light-emitting diode (LED), and the data computation conditions were as described below.

Computation Conditions (Sample refractive index)

LD real part: 1.48

LD imaginary part: 0.45

LED real part: 1.50

LED imaginary part: 0.55

Dispersion medium refractive index

LD real part: 1.33

LD imaginary part: 0.00
LED real part: 1.33
LED imaginary part: 0.00
(Number of repetitions): 15 times
(Particle diameter criterion): Volume
(Computation algorithm): Standard computation 5. Coarse Particle Ratio The coarse particle ratio was calculated from Expression (1) using the coarse particle-side peak area A and the fine particle-side peak area B in the particle size distribution of the cathode material for a lithium-ion secondary battery which had been obtained in the measurement of the median diameter.

$$\text{Coarse particle ratio (\%)} = A/(A+B) \times 100 \quad (1)$$

6. Chromaticity b*

The chromaticity b* in the L*a*b* color space of the cathode material for a lithium-ion secondary battery was measured by means of reflected light two-degree viewing angle measurement in which a spectrophotometer (Model No.: SE-2000, manufactured by Nippon Denshoku Industries Co., Ltd.) and a D65 light source were used. When the chromaticity b* of the cathode material for a lithium-ion secondary battery was measured, the cathode material which was the measurement subject was evenly placed on a schale, and the chromaticity b* of the cathode material was measured.

Figure 3:
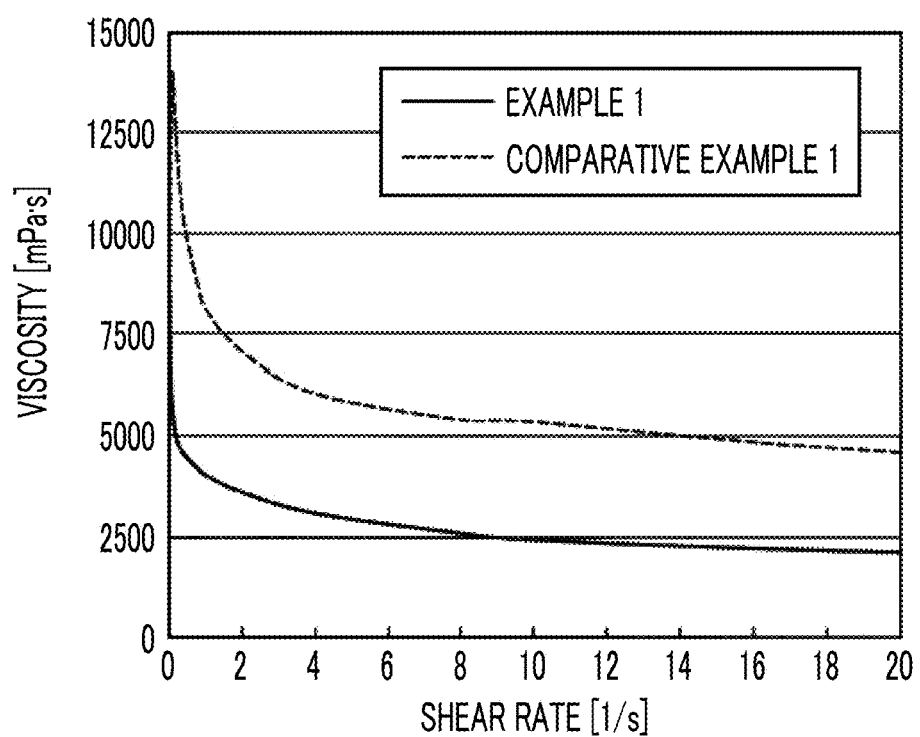
FIG. 3 is a view illustrating relationships between a viscosity and a shear rate of cathode material paste in Example 1 and Comparative Example 1.

Evaluation of Paste for Lithium-Ion Secondary Battery and Cathode for Lithium-Ion Secondary Battery 7. Paste Viscosity Regarding the viscosity of paste for a lithium-ion secondary battery, for the cathode material paste produced using the above-described method, a dynamic viscoelasticity measurement instrument (Model No.: RS-6000, manufactured by Thermo Fisher Scientific Inc.) was used, the measurement temperature was 25° C., a C20/4-TiL10 sensor was used, the gap between the sensor and a plate was 0.14 mm, the shear rate was increased in a range from 0.01 [1/s] to 20 [1/s] in each 15-second step, and the viscosity at a shear rate of 4.0 [1/s] was scanned. FIG. 3 illustrates relationships between the viscosity and the shear rate of the cathode material paste in Example 1 and Comparative Example 1.

8. Cathode Density

The cathode density of the cathode material for a lithium-ion secondary battery was calculated as the ratio of the mass of the cathode material as the numerator to the volume of the cathode which was the compressed cathode excluding the aluminum electrode current collector as the denominator.

In addition, in a case in which the cathode density was 2.00 g/cc or more, the cathode density was evaluated as A, in a case in which the cathode density was 1.90 g/cc or more, the cathode density was evaluated as B, and, in a case in which the cathode density was less than 1.90 g/cc, the cathode density was evaluated as C.

Evaluation of Lithium-Ion Secondary Battery

9. Capacity Retention After 20 Cycles

Regarding the capacity retention of the lithium-ion secondary battery after 20 cycles, constant-current charging was carried out at a current value of 0.25 C until the battery voltage reached 3.7 V and then discharging was carried out at a current value of 0.5 C until the battery voltage reached 2.5 V in an environment of 45° C. in one cycle, this cycle was repeated 20 times, and the proportion of the discharge capacity at the $20^{th}$ cycle as the numerator to the discharge capacity at the first cycle as the denominator was evaluated as the capacity retention. In a case in which the electron conductivity of the cathode material was not sufficiently guaranteed, the active material particles repeatedly expanded and shrank according to the charge and discharge cycles, and thus the number of electron conduction paths in the cathode became insufficient, and thus the capacity retention decreased.

In addition, in a case in which the capacity retention after 20 cycles was 70% or more, the electron conductivity was evaluated as B, and, in a case in which the capacity retention after 20 cycles was less than 70%, the electron conductivity was evaluated as C.

Evaluation Results

The evaluation results of the cathode materials for a lithium-ion secondary battery and the lithium-ion secondary batteries of Examples 1 to 9 and the evaluation results of the cathode materials for a lithium-ion secondary battery and the lithium-ion secondary batteries of Comparative Examples 1 to 6 are shown in Table 1. Meanwhile, the amount of carbon in Table 1 is the amount (parts by mass) of carbon forming the carbonaceous film with respect to 100 parts by mass of the cathode active material.

TABLE 1

|  | Agglomerate supply rate [g/hour] | Paste density [mPs · s] | Coarse particle ratio [%] | Specific surface area [m²/g] | Amount of carbon [parts by mass] | Powder resistance value [Ω · cm] | Chromaticity b* | Median diameter [μm] | Cathode density [g/cc] | Cathode density evaluation | Capacity retention after 20 cycles [%] | Electron conductivity evaluation |
|---|---|---|---|---|---|---|---|---|---|---|---|---|
| Example 1 | 200 | 3080 | 61 | 8.6 | 1.06 | 26 | 1.88 | 0.78 | 1.91 | B | 76 | B |
| Example 2 | 180 | 2950 | 58 | 8.6 | 1.06 | 30 | 1.91 | 0.74 | 1.93 | B | 75 | B |
| Example 3 | 150 | 2890 | 54 | 8.7 | 1.06 | 39 | 1.98 | 0.71 | 1.95 | B | 73 | B |
| Example 4 | 120 | 2800 | 46 | 8.6 | 1.06 | 45 | 2.08 | 0.67 | 1.99 | B | 73 | B |
| Example 5 | 100 | 2750 | 43 | 8.7 | 1.06 | 58 | 2.20 | 0.62 | 2.04 | A | 72 | B |
| Example 6 | 90 | 2710 | 41 | 8.7 | 1.06 | 60 | 2.22 | 0.59 | 2.06 | A | 72 | B |
| Example 7 | 100 | 2590 | 51 | 5.9 | 0.73 | 25 | 2.21 | 0.54 | 2.08 | A | 77 | B |
| Example 8 | 90 | 3320 | 46 | 15.5 | 1.91 | 78 | 2.26 | 0.63 | 1.99 | B | 72 | B |
| Example 9 | 80 | 4640 | 43 | 24.0 | 2.96 | 92 | 2.28 | 0.71 | 1.91 | B | 71 | B |
| Comparative Example 1 | 280 | 6030 | 71 | 8.4 | 1.06 | 10 | 1.82 | 0.85 | 1.81 | C | 77 | B |
| Comparative Example 2 | 250 | 5820 | 68 | 8.4 | 1.06 | 15 | 1.86 | 0.83 | 1.86 | C | 76 | B |
| Comparative Example 3 | — | 6640 | 100 | 8.3 | 1.06 | 9 | 1.75 | 8.50 | 1.70 | C | 80 | B |
| Comparative Example 4 | — | 6380 | 100 | 5.7 | 0.73 | 7 | 1.71 | 8.30 | 1.75 | C | 79 | B |

TABLE 1-continued

|  | Agglomerate supply rate [g/hour] | Paste density [mPs·s] | Coarse particle ratio [%] | Specific surface area [m²/g] | Amount of carbon [parts by mass] | Powder resistance value [Ω·cm] | Chromaticity b* | Median diameter [μm] | Cathode density [g/cc] | Cathode density evaluation | Capacity retention after 20 cycles [%] | Electron conductivity evaluation |
|---|---|---|---|---|---|---|---|---|---|---|---|---|
| Comparative Example 5 | 65 | 5250 | 31 | 15.8 | 1.91 | 351 | 2.35 | 0.52 | 2.02 | A | 64 | C |
| Comparative Example 6 | 55 | 5960 | 29 | 24.4 | 2.96 | 542 | 2.40 | 0.64 | 1.98 | B | 51 | C |

When Example 1 to Example 9 and Comparative Example 1 to Comparative Example 6 are compared on the basis of the results of Table 1, in Comparative Example 1 to Comparative Example 6 in which the viscosity exceeded 5,000 mPa·s when the shear rate of the paste having a total solid content amount of 45% by mass was 4.0 [1/s], neither the electron conductivity nor the cathode density was sufficient. In contrast, in Example 1 to Example 9 in which the viscosity was 5,000 mPa·s when the shear rate of the paste having a total solid content amount of 45% by mass was 4.0 [1/s], it was confirmed that it was possible to improve the cathode density while guaranteeing the electron conductivity.

Lithium-ion secondary batteries for which the cathode material for a lithium-ion secondary battery of the present invention is used have an excellent energy density, input and output characteristics, and durability and are thus capable of significantly contributing to the advancement of the reliability of lithium-ion secondary batteries including mobile body uses.

What is claimed is:

1. A cathode material for a lithium-ion secondary battery comprising:
    active material particles including central particles represented by general formula $Li_xA_yD_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$) and a carbonaceous film that coats surfaces of the central particles,
    wherein
    an average primary particle diameter of the cathode material is 10 nm or more and 400 nm or less,
    the BET specific surface area of the cathode material is 5 m²/g or more and 25 m²/g or less,
    an amount of carbon forming the carbonaceous film is 0.1 parts by mass or more and 10 parts by mass or less with respect to 100 parts by mass of the central particles,
    the cathode material has a peak of coarse particles and a peak of fine particles in a particle size distribution of the cathode material, and
    a coarse particle ratio in the particle size distribution of the active material particles is 35% or more and 65% or less,
    the cathode material has properties, wherein a viscosity of a cathode material paste is 2590 to 4640 mPa·s at a shear rate of 4.0 [1/s], wherein
    the cathode material paste is prepared by dissolving a mixture of the active material particles, a conductive auxiliary agent and a binder in which a mixing ratio thereof is 94:1:5 in terms of a mass ratio in a solvent so that the cathode material paste has a total solid content amount of 45% by mass,
    the shear rate is measured at a temperature of 25° C.,
    the binder is a polytetrafluoroethylene resin, a polyvinylidene fluoride resin or fluorine rubber and,
    the conductive auxiliary agent is at least one selected from the group consisting of particulate carbon, vapor-grown carbon fiber and fibrous carbon.

2. The cathode material for a lithium-ion secondary battery according to claim 1,
    wherein a powder resistance value of the active material particles is 100 Ω·cm or less.

3. The cathode material for a lithium-ion secondary battery according to claim 1,
    wherein a median diameter of the active material particles is 0.50 μm or more and 0.80 μm or less, and chromaticity b* in an L*a*b* color system of the cathode material is 1.9 or more and 2.3 or less.

4. The cathode material for a lithium-ion secondary battery according to claim 1,
    wherein a maximum value of fine particle area in the particle size distribution of the active material particles is 0.15 μm or more and 0.35 μm or less, and a maximum value of coarse particle area in the particle size distribution of the active material particles is 0.80 μm or more and 1.20 μm or less.

5. A cathode for a lithium-ion secondary battery, comprising:
    an electrode current collector; and
    a cathode mixture layer formed on the electrode current collector,
    wherein the cathode mixture layer includes the cathode material for a lithium-ion secondary battery according to claim 1.

6. A lithium-ion secondary battery comprising:
    the cathode for a lithium-ion secondary battery according to claim 5.

7. The cathode material for a lithium-ion secondary battery according to claim 1,
    wherein the cathode material consists of the active material particles.

8. The cathode material for a lithium-ion secondary battery according to claim 1, wherein the cathode material is cracked particles which are formed by cracking agglomerates of primary particles with a jet mill.

9. The cathode material for a lithium-ion secondary battery according to claim 8, wherein the agglomerates are cracked such that a supply rate of the agglomerates into the jet mill is 80 to 200 g/hour.

10. A cathode material for a lithium-ion secondary battery comprising:
    active material particles including central particles represented by general formula LixAyDzPO4 (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$) and a carbonaceous film that coats surfaces of the central particles, wherein an average primary particle diameter of the cathode material is 10 nm or more and 400 nm or less, a BET specific surface area of the cathode material is 5 m2/g or more and 25 m2/g or less, an amount of carbon forming the carbonaceous film is 0.1 parts by mass or more and 10 parts by mass or less with respect to 100 parts by mass of the central particles, the cathode material is cracked particles which are formed by cracking agglomerates of primary particles, the cathode material has a peak of coarse particles and a peak of fine particles in a particle size distribution of the cathode material, a coarse particle ratio in the particle size distribution of the active material particles is 35% or more and 65% or less, a median diameter of the active material particles is 0.50 μm or more and 0.80 μm or less, a maximum value of fine particle area in the particle size distribution of the active material particles is 0.15 μm or more and 0.35 μm or less, and a maximum value of coarse particle area in the particle size distribution of the active material particles is 0.80 μm or more and 1.20 μm or less, and the cathode material has properties, wherein a viscosity of a cathode material paste is 5,000 mPa·s or less at a shear rate of 4.0 [1/s], wherein the cathode material paste is prepared by dissolving a mixture of the active material particles, a conductive auxiliary agent and a binder in which a mixing ratio thereof is 94:1:5 in terms of a mass ratio in a solvent so that the cathode material paste has a total solid content amount of 45% by mass, the shear rate is measured at a temperature of 25° C., the binder is a polytetrafluoroethylene resin, a polyvinylidene fluoride resin or fluorine rubber, and the conductive auxiliary agent is at least one selected from the group consisting of particulate carbon, vapor-grown carbon fiber and fibrous carbon.

11. The cathode material for a lithium-ion secondary battery according to claim 10, wherein the cathode material consists of the active material particles.

12. The cathode material for a lithium-ion secondary battery according to claim 10, wherein the cathode material is cracked particles which are formed by cracking agglomerates of primary particles with a jet mill.

13. The cathode material for a lithium-ion secondary battery according to claim 10, wherein the agglomerates are cracked such that a supply rate of the agglomerates into the jet mill is 80 to 200 g/hour.

\* \* \* \* \*